E. C. HUBBARD.
Car-Coupling.

No. 133,369.  Patented Nov. 26, 1872.

Witnesses:
A. W. Almquist
W. A. Graham

Inventor:
Erwin C. Hubbard
per
Attorneys.

UNITED STATES PATENT OFFICE.

ERWIN C. HUBBARD, OF GREEN BAY, WISCONSIN.

IMPROVEMENT IN CAR-COUPLINGS.

Specification forming part of Letters Patent No. 133,369, dated November 26, 1872.

*To all whom it may concern:*

Figure 1:
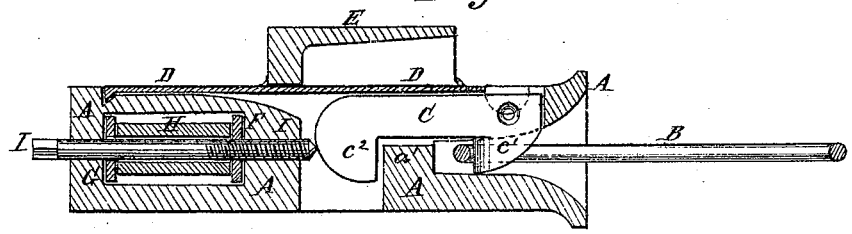
Figure 2:
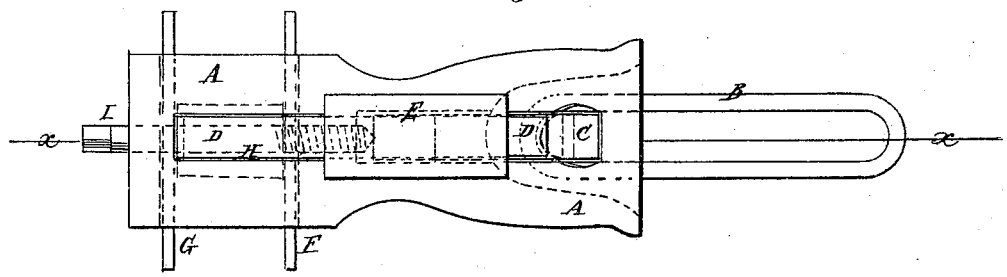

Be it known that I, ERWIN C. HUBBARD, of Green Bay, county of Brown, State of Wisconsin, have invented a new and useful Improvement in Car-Couplings, of which the following is a specification:

Figure 1 is a vertical longitudinal section of my improved car-coupling taken through the line $x\ x$, Fig. 2. Fig. 2 is a top view of the same.

My invention has for its object to furnish an improved car-coupling, simple in construction, strong, durable, reliable in operation, not liable to get out of order, and which will couple itself as the cars are run together; and it consists in the construction and combination of the various parts of the coupling, as hereinafter more fully described.

A represents the bumper-head, in the forward end of which is formed a mouth or recess to receive the coupling-link B. C is the coupling-hook, which is a bar having a hook formed upon each end. The bar C is placed in a slot in the upper side of the bumper-head A, the forward hook $c^1$ of said bar projecting downward into the mouth or throat of the bumper-head, and its rear hooks $c^2$ projecting downward into a slot or recess in the middle part of the bumper-head so as to sustain the draft-strain by resting against the solid part $a'$ of the bumper-head between the said hooks $c^1\ c^2$, as shown in Fig. 1. The hook-bar $c$ is held down into its place by a spring, D, laid in a groove formed to receive it in the upper side of the bumpers A, and which is kept from moving longitudinally by a hook or flange formed upon its rear end, and which enters a recess in the said bumper-head, as shown in Fig. 1. The spring D is held down in its place by the edge of the rear end of the shield E, which edge crosses the said spring, as shown in Figs. 1 and 2. The shield E is made hollow and open at its front end, and serves as a guard to prevent the hook from being pressed down or jammed, so that it cannot be raised by the entering link, and as a guide to prevent the bumper-head from lifting. F G are the plates by which the bumper-head is connected with the car, and between which is placed the spring H that receives the pressure when the car is started and stopped. The plates F G and spring H are placed in a horizontal slot in the rear part of the bumper-head A, and are kept in their proper positions by a rod or spindle, I, which passes in through the rear end of the bumper-head, and passes through the said spring and plates, as shown in Figs. 1 and 2. The hook C may be pivoted to the bumper-head, if desired, but I prefer to lay it in loose, as first described. The hook C may be raised to uncouple the cars by chains, levers, rods, or other means, as may be desired or convenient.

Having thus described my invention, I claim as new and desire to secure by Letters Patent—

The shield E formed upon the upper side of the bumper-head A, in combination with the hook-bar C $c^1\ c^2$ and spring D, substantially as herein shown and described, and for the purposes set forth.

ERWIN C. HUBBARD.

Witnesses:
G. E. MATILE,
GEORGE W. WRIGHT.